Sept. 13, 1932.  H. F. SHINDEL  1,876,770
ADJUSTABLE BAND CONNECTER
Filed Dec. 23, 1931
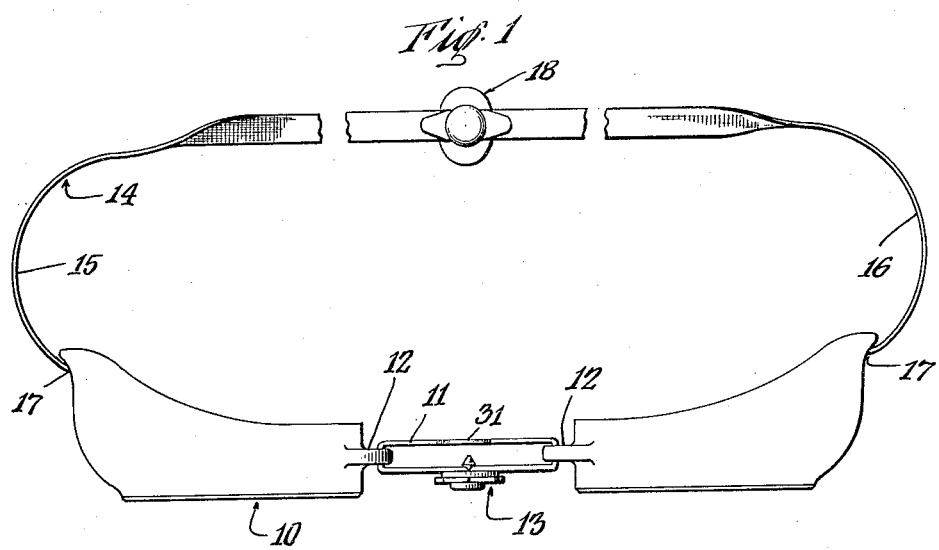
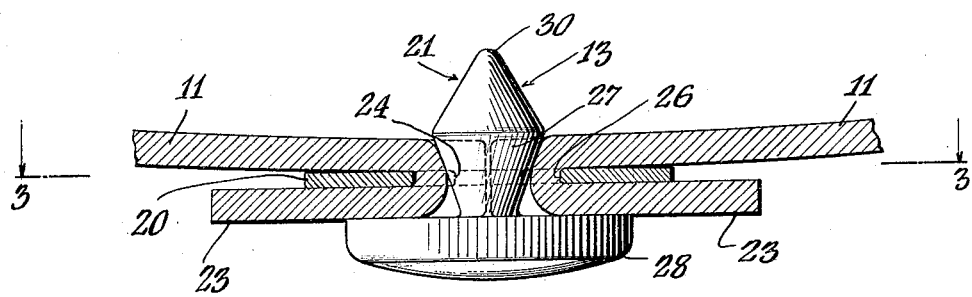
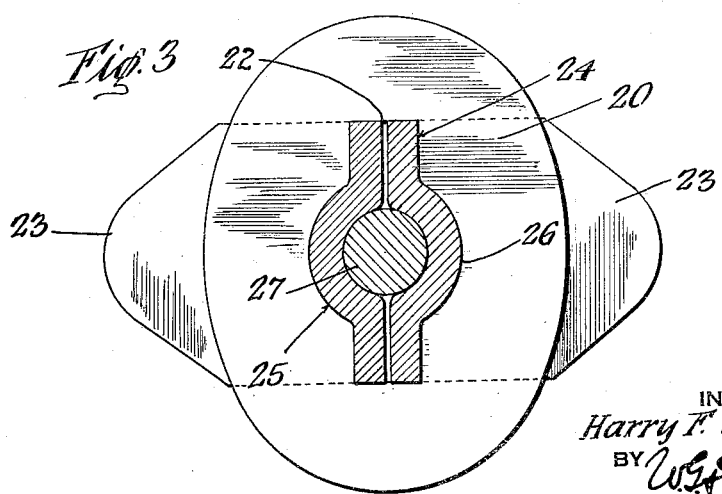
INVENTOR
Harry F. Shindel
BY
ATTORNEYS Patented Sept. 13, 1932

1,876,770

UNITED STATES PATENT OFFICE

HARRY F. SHINDEL, OF READING, PENNSYLVANIA, ASSIGNOR TO WILLSON PRODUCTS, INC., OF READING, PENNSYLVANIA, A CORPORATION OF PENNSYLVANIA

ADJUSTABLE BAND CONNECTER

Application filed December 23, 1931. Serial No. 582,771.

My invention relates to band connecters and particularly to a simple device for adjustably connecting the ends of a flexible band or bands.

The invention will be described in conjunction with flexible straps employed as a nose bridge or head band for goggles for adjustably connecting their ends. However, it is to be understood that band connecters according to my invention may also be utilized for connecting the ends of bands or straps adapted to a wide variety of uses.

In the drawing:

Figure 1 is a diagrammatic view of a pair of goggles embodying band connecters according to my invention for securing the free ends of the straps which constitute the nose-bridge and head band for the goggles;

Figure 2 is an enlarged view, partly in section, of my band connecter associated with band ends secured thereby; and Figure 3 is an enlarged sectional view of the parts of the band connecter.

Referring to Figure 1, the numeral 10 indicates the lens-frames of a pair of goggles which are inter-connected in spaced relation by a nose bridge comprising a single flexible and compressible band or strap 11 looped through apertures in ears 12 on the frames and having its ends adjustably and detachably connected together by my band connecter which is designated as a whole by the numeral 13. The head band 14 for the goggles comprises a pair of flexible straps 15, 16 each having one end attached to a lens-frame at 17 and having their free ends adjustably connected together by a similar band connecter 18.

As shown on an enlarged scale in Figures 2 and 3 each band connecter 13 or 18 comprises but two parts, a thin flat plate 20 and a stud 21 cooperating therewith. Plate 20 may be of any desirable shape and has a narrow, centrally located slot 22 through which the end portions 23 of the strap 11 extend. The width of slot 22 preferably corresponds substantially to twice the thickness of the strap 11 so that when the strap ends are passed through slot 22 one face of each end portion is in contact with a wall 24 of the slot and their opposite faces are in close contact with each other as indicated in dotted lines in Fig. 2.

Intermediate its ends slot 22 is enlarged or widened as indicated at 25, for example by forming a circular opening 26 through the central portion of plate 20. The shank of stud 21 is reversely tapered to provide a frusto-conical part 27 adjacent its flanged head 28 and a substantially cone-shaped, wedge-like end 30. The shank of stud 21 is adapted to be pressed between the contacting faces of strap 11 and through the plate aperture 26 compressing the portions of strap 11 which lie in slot 22 and forcing them into binding contact with the walls 24 of the slot.

Aperture 26 is of somewhat greater diameter than the largest part of the stud shank to provide spaces at opposite sides of the shank for receiving the displaced central portions of the strap as the stud spreads the end portions of the strap. The flanged head 28 of the stud securely holds the end portions of the strap against the face of plate 20 over which they extend in overlapping relation to the adjacent parts of the strap. The shank of the stud is preferably of greater length than the thickness of plate 20 so that the frusto-conical part 27 extends partially beyond the back of the plate binding portions of the strap at the back of the plate against the edges of slot 22 and is in turn frictionally held at opposite sides by the strap for locking the stud in place.

My band connecter is particularly adapted for use in conjunction with the flexible nose bridge strap 11 of a pair of goggles as described above because it permits ready adjustment of the nose bridge strap to adapt the goggles to the required spacing of the eyes of a wearer. The stud 21 may be readily withdrawn by grasping its flanged head 30 and pulling the stud from between the end portions of the strap or by pressing the tip of the shank against an unyielding surface. By drawing more or less of the end portions of the strap through the slot in plate 20 the effective length of the nose bridge may be desirably adjusted. The adjustment is then securely maintained on replacement of stud 21 by its cooperation with the end portions of the strap and with plate 20 as described above. If desired nose-bridge strap 11 may be provided with an enlarged portion 31 adapted to underlie the band connecter and serve as a pad to protect the wearer from contact with the tip of stud 21. Likewise the goggle head band may be adjusted to fit the head of the wearer.

It will also be apparent that as previously suggested, my simple band-connecter may equally well be employed in conjunction with straps of many varying types and may be utilized either as an adjustment permitting connecter for their free ends or as a disengageable fastener therefor.

Although the construction of an illustrative embodiment of my band connecter has been described in detail it is apparent that many changes and variations may be made without departing from the invention and I desire to include all such changes and variations within the scope of the appended claims.

What I claim is:

1. In combination with the ends of a band; a connecter therefor comprising a plate having an aperture for receiving said ends; and a stud extending through said aperture and having enlarged end parts engaging said band at opposite sides of said plate to retain said stud positioned on said plate for securing said ends thereto.

2. In combination with the ends of a flexible band; a connecter for said ends comprising; a plate having a slot through which said band ends extend so that they project from the face of said plate; and a stud having a flanged head for disengageably holding the projecting end portions of said band against the face of said plate and a shank extending into said slot between the band portions which lie therein for binding them against opposite walls of said slot.

3. In combination with the ends of a flexible band; a connecter therefor; a plate provided with a slot through which said band ends extend, said slot having a width corresponding substantially to twice the thickness of said band and being enlarged intermediate its ends; and a stud having a shank of slightly lesser thickness than the width of the enlarged part of said slot and extending into said enlarged slot part between the band portions in said slot for compressing and wedging them against the walls of said slot.

4. A band connecter comprising a thin flat plate provided with a parallel-walled slot formed with an enlarged portion; a flexible and compressible band having end portions extending through said slot; and a stud extending between band portions which lie in said slot and pressing them into frictional engagement with said plate in the enlarged portion of said slot.

5. In combination with the end portions of a flexible and compressible band; a band connecter comprising a plate having an aperture through which said band extends with its end portions projecting from the face of said plate; a stud having a shank extending through said aperture between portions of said band which lie therein; and enlarged ends on said stud-shank engaging portions of said band and binding the latter against the face and back of said plate.

6. In combination with the ends of a flexible band; a band connecter comprising a plate provided with an aperture through which the end portions of said band extend; and a stud having a shank provided with a tapered portion extending between and engaging the portions of said band which lie in said aperture and binding said band portions against the walls of said aperture, the thickest part of said tapered portion being spaced from the back of said plate and binding band portions against the edges of said aperture at the back of said plate.

7. In combination with the ends of a flexible band; a band connecter comprising a plate provided with an aperture through which the end portions of said band extend; a stud having a shank extending into said aperture between the band portions which lie therein a tapered tip on said shank for spreading the band portions which lie in said aperture on entering the latter; and a reversely tapered portion adjacent said tip engaging said band portions to bind the latter against the walls of said aperture and against the edges thereof at the back of said plate.

In testimony whereof, I affix my signature.

HARRY F. SHINDEL.